United States Patent [19]

Intichar et al.

[11] Patent Number: 4,727,724
[45] Date of Patent: Mar. 1, 1988

[54] CRYSOSORPTION PUMP FOR THE ROTOR OF AN ELECTRIC MACHINE HAVING A SUPERCONDUCTING EXCITER WINDING

[75] Inventors: Lutz Intichar; Wolfgang Schmidt; Christoph Schnapper, all of Erlangen; Karl-Heinz Spiess, Moers; Erich Weghaupt, Mülheim on the Ruhr, all of Fed. Rep. of Germany

[73] Assignee: Siemens Aktiengesellschaft, München, Fed. Rep. of Germany

[21] Appl. No.: 23,137

[22] Filed: Mar. 9, 1987

[30] Foreign Application Priority Data

Mar. 19, 1986 [DE] Fed. Rep. of Germany ....... 3609273

[51] Int. Cl.$^4$ .............................................. B01D 8/00
[52] U.S. Cl. ...................................... 62/55.5; 62/505; 310/64
[58] Field of Search ................. 62/55.5, 505; 310/52, 310/64

[56] References Cited

U.S. PATENT DOCUMENTS

| 3,648,473 | 3/1972 | Stephenson | 62/55.5 |
| 4,079,273 | 3/1978 | Lambrecht et al. | 62/505 |
| 4,274,022 | 6/1981 | Elsel | 62/55.5 |

FOREIGN PATENT DOCUMENTS 0144522  9/1984  European Pat. Off. .
2415212  2/1979  France .

OTHER PUBLICATIONS

Theorie und Praxis der Vakuumtechnik, Advances in Cryogenic Engineering, vol. 23, by K. D. Timmerhaus.
Helium Pumping at 4.2 K by Molecular Sieve 5A, by P. W. Fisher and J. S. Watson.
Technical Overview of the German Program to Develop Superconducting AC Generators, by L. Intichar.
Development of a Helium Transfer Coupling for a Superconducting Generator Rotor, by B. B. Gamble.
Desorption Cooling Below 12 K Using He$^4$ Desorbed from Synthetic Zeolite, by J. G. Daunt and C. Z. Rosen.

Primary Examiner—Ronald C. Capossela
Attorney, Agent, or Firm—Kenyon & Kenyon

[57] ABSTRACT

A cryosorption pump for perpetuating a thermal insulating vacuum in the superconducting rotor of an electric machine, in particular, a turbogenerator, is constructed in a co-rotating transfer part of the rotor along the axis of rotation thereof. The rotor comprises a superconducting exciter winding part which is to be cooled by a cryogenic coolant, and to which winding part the coolant is introduced via at least one appropriate coolant supply line. The chambers of the rotor winding part to be evacuated are directly connected to the cryosorption pump in the co-rotating transfer part. Furthermore, the cryosorption pump is thermally connected within the co-rotating transfer part with the at least one coolant supply line.

17 Claims, 3 Drawing Figures

CRYOSORPTION PUMP FOR THE ROTOR OF AN ELECTRIC MACHINE HAVING A SUPERCONDUCTING EXCITER WINDING

BACKGROUND OF THE INVENTION

The invention relates to the field of electric machinery design generally, and more particularly to providing a cryosorption pump for perpetuating a thermal insulating vacuum in the superconducting rotor of an electric machine, such as a turbogenerator.

Recent developments in the field of electric machinery design suggest providing a superconducting exciter winding for the rotor of an electric machine, for example a turbogenerator, that is generally cooled with liquid helium. To limit heat transfer from the outside to this refrigerated winding, the Winding is appropriately surrounded by an insulating vacuum, which in general should be less than $10-6$ mbar. Because of the cooling with liquid helium, all gas components with the exception of helium are indeed bound to helium-cold surface portions of the rotor due to a cryopumping effect. However, the insulating vacuum is diminished by helium leaks of the helium-carrying rotor parts, in particular at solder and weld joints. For the helium-carrying parts of the machine, when the machine is operated for more than one year, the leakage rate should be less than $10-10$ mbar liters each second if it is not to be necessary to pump the helium out of the insulating vacuum. However, such low leakage rates can be achieved only at very high cost of engineering in the selection of materials and in the production process. Typically, the leakage rates for the helium-carrying parts are approximately $10^{-8}$ mbar liters per second. With long operating periods of several years, as required for turbogenerators, an impermissible pressure rise of the insulating vacuum results. For example, at this typical leakage rate, in a vacuum volume of 1000 liters, the pressure increases to $10^{-4}$ mbar in less than a year. Hence a pump is needed which can pump off the helium reliably and largely without maintenance over the period referred to.

If, for this purpose, an external pump is used, then, for connection to the rotating vacuum chambers of the rotor in a so-called connection head, a transition from fixed to rotating parts of a pump conduit with an appropriate vacuum rotary bushing in the connection head is necessary. The pump conduit extends through a corotating transition part which, in the form of a shaft end piece of the rotor, protrudes into the connection head. This transition part on the side of the rotor away from the drive serves in particular to receive vacuuminsulated coolant lines between the connection head and the actual rotor or coil body (see, for example, "Development of a Helium Transfer Coupling for a Superconducting Generator Rotor" by B.B. Gamble in *Advances in Cryogenic Engineering*, vol. 23, 1978, pages 125 to 129 and pages 132 to 139). The vacuum rotary bushing in the connection head can be sealed in particular by a so-called ferrofluid seal (See, for example, German Offenlegungsschrift 20 34 213). The difficulty here is, however, that the suction capacity of the pump is considerably reduced by the conduction values of the relatively long connecting lines and by the vacuum bushing. Besides, the vacuum rotary bushing to be sealed with ferrofluid is especially sensitive to shaft vibrations, and thus is a possible source of malfunction in the power plant operation.

Another known solution is to install a co-rotating cryosorption pump in the rotor which has no mechanical connection to the surrounding. This, therefore, eliminates any requirement for a separate pump conduit to the outside with a critical vacuum rotary bushing. Such an evacuating device with an ionization getter pump is known from the German Auslegeschrift 28 26 501.

To maintain a thermo-insulating vacuum in the rotor of a turbogenerator with a superconducting exciter winding, there may be used advantageously also a cryosorption pump as described, for example, in the German Offenlegungsschrift 28 06 576. The respective pump principle is known generally (see, for example, M Wutz: "Theory and Practice of Vacuum Technology" (in German), Brunswick, 1965, in particular pages 213 to 222). In this known generator, the pump is disposed in the active part on the coil former of the rotor and is connected with the vacuum chambers of the rotor by means of ports. For cooling the rotor, the pump is thermally coupled to cold helium which is supplied to the exciter winding via a corresponding supply line. As sorbents are used, in particular, zeolites or activated carbon, these sorbents may be bound either loosely or fixed to metallic substrates. Because of the structure of the known cryosorption pump in the region of the exciter winding of the rotor body being situated radially far out from its axis, only a limited space is available for this pump, which is relatively complicated in its design. Besides, after assembly of the rotor, this pump cannot readily be removed again, making it extremely, difficult to service.

The problem presented by known devices then is to improve the design of cryosorption pumps in the sense that the pump should permit a relatively simple construction, not requiring any special measures for the realization of the rotor coil form carrying the exciter winding.

SUMMARY OF THE INVENTION

According to the present invention, the problems and related problems of the prior art are solved in that the cryosorption pump is arranged in a central vacuum chamber of the transfer part along the axis of rotation thereof the pump being thermally connected there with at least one coolant supply line.

The central vacuum chamber, through which there extends necessarily also a coolant supply line is thus utilized additionally to receive the cryosorption pump. The surface areas of the sorption pump to be cooled can without difficulty be thermally coupled to this supply line. The advantages associated with this design are to be seen in particular in that, for one thing, the pump surfaces extend practically over the total axial length of the transfer part and thus can have an extended active surface. For another thing, the pump is relatively easy to install there, so that it is also easy to service.

Other advantageous features of the cryosorption pump according to the present invention will become evident from the drawing and the following description of one embodiment.

BRIEF DESCRIPTION OF THE DRAWINGS

FIGS. 1A and 1B show a longitudinal section through the transfer part of a rotor of a superconduc

DETAILED DESCRIPTION

In cryosorption pumps, gases are carefully removed from a vacuum vessel since these gases are bound to a cooled surface by adsorption in not much more than one mono-layer. The forces between an adsorbed gas molecule and an as yet little covered cold surface are relatively great, especially when rough surfaces are provided. Thus, for example, the adsorption energy for helium on activated carbon is $E \approx 0.65$ kcal/mol. Helium, therefore, can effectively be pumped by cryosorption. However, since the adsorption capacity of a cold surface is limited to one mono-layer as a maximum, greater quantities of gas can be adsorbed practically only by correspondingly extended surfaces. To be able to adsorb, for example, an occurring gas quantity of about $4 \times 10^{-4}$ mbar×liter, there is needed, in fact, a surface of about $3.3 \times 10^4 m^2$. For this reason, porous materials are used which have a specific internal surface of, for example, 500 $m^2/g$ (see, for example, Journal of Vacuum Science Technology, Vol. 2 "Cyrosorption Pumping of Hydrogen and Helium at 20° K" by Stern et al. (1965), pages 165 to 177).

The porous sorbents most frequently used are activated carbon and so-called molecular sieve zeolites, which are available in the form of grains or rods about .2 mm in diameter. Zeolites are synthetic alkali or alkaline earth aluminosilicates which, after removal of water of crystallization, for example, by heating for 24 hours at about 300° C, have defined pore diameters between 3 and 10 angstroms.

For the helium to be pumped effectively, the sorbent must be cooled to temperatures below 10° K and be protected from heat radiation to prevent superficial heating. Also, the sorbent should not be covered beforehand with other gases such as $H_2$, $O_2$, $N_2$ or $H_2O$ vapor, as the adsorption capacity for helium would then greatly diminish (see, for example, *Journal of Vacuum Science Technology*, 16 (1979), pages 75 to 78; "Helium Pumping at 4.2K by Molecular Seive 5A" by Fisher, et al.)

From this discussion, two requirements follow:

1. The sorption pump must be regenerated before the cooling. For the regeneration of activated carbon, it suffices as a rule to pump off the adsorbed gases at room temperature, which after prolonged standing in air requires 1 to 2 days (for, say, 20 g activated carbon). Zeolite, on the other hand, can be reqenerated only by heating to approximately 200° C. for 24 hours under vacuum (Cryogenics, Vol. 12, 1972, pages 201 to 208, "Desorption Cooling Below 12K using $He^4$ Desorbed from Synthetic Zeolite", Daunt et al.)

2. The pump must be constructed so that at least to a large extent only the helium atoms can penetrate to the cold sorption areas.

Figure 1:
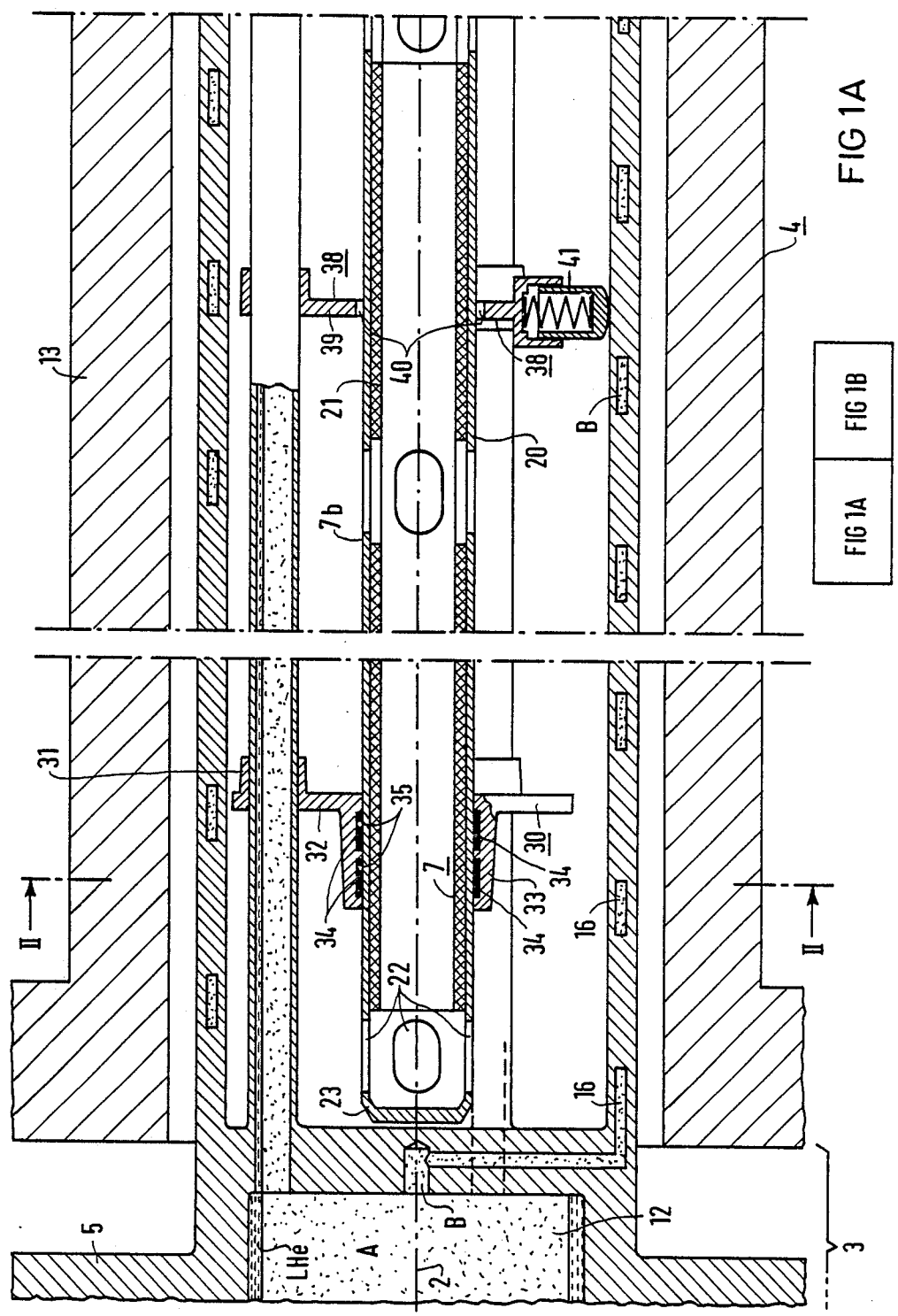
FIG. 1 is a key figure showing the interconnection of FIG. 1A and FIG. 1B.
Figure 2:
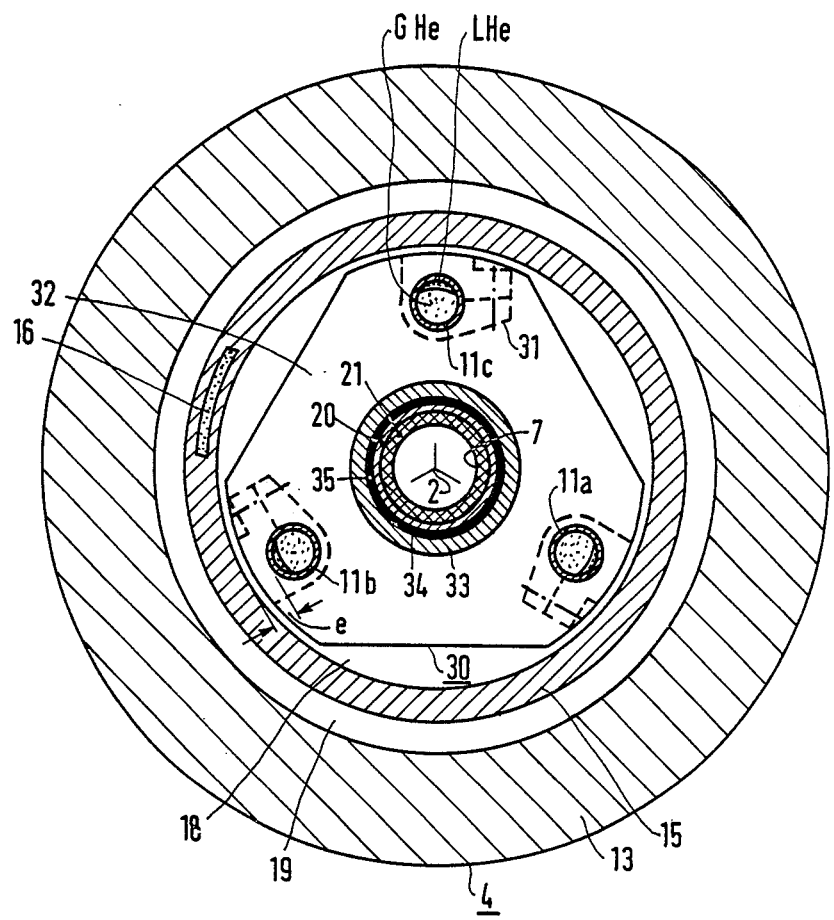
- FIG. 2 shows a transverse section through the transfer part shown in FIGS. 1A and 1B.

These requirements are fulfilled in the cryosorption pump according to the present invention. The pump serves to maintain a thermally insulating vacuum in the rotor of an electric machine, in particular a turbogenerator, with a superconducting exciter winding. Referring to FIGS. 1A, 1B and 2, similar reference characters have been used to denote similar elements. The rotor contains a rotor body 3 mounted for rotation about an axis 2; it is not illustrated in detail in FIGS. 1A and 1B as it is generally known. An embodiment example of such a rotor body is evident, for example, from the publication, IEEE *Transactions on Magnetics*, Vol. MAG-19, No. 3, May 1983, "The German Program to Develop Superconducting AC Generators", by Intichar et al. pages 536 to 540. In the rotor body 3, called also a winding carrier, the conductors of the superconducting exciter winding, not shown in detail in the figure, are arranged, for example, in grooves. They are cooled by liquid helium as a cryogenic coolant, which is taken from an external coolant supply system and is introduced via a helium coupling at a so-called connecting head into a co-rotating transfer part 4 of the rotor. With the aid of such a helium coupling, known in itself, the coolant is transferred between fixed and rotating parts of the machine. The transfer part 4, merely shown in limited detail in FIGS. 1A and 1B represents a shaft end-piece of the rotor which extends on the side thereof away from the drive between the respective end face 5 of the rotor body 3 and the connection head not shown in the Figure. The cryosorption pump 7 according to the invention is located in this transfer part 4.

The cryogenic coolant A cooling the superconducting exciter winding, for instance a two-phase mixture of liquid helium LHe and gaseous helium GHe, passes from a helium space 8 in an end-piece 9, facing the connection head, of the tubular transfer part 4 via an annular collecting trough 10 into several coolant supply lines 11a, 11b, 11c, which are arranged in regular distribution on an imaginary cylinder surface about the axis of rotation 2 in circumferential direction. Of the three coolant supply lines (11a to 11c) assumed according to the illustrated embodiment, only two of these lines, 11a and 11b, are visible in FIGS. 1A or 1B. Via these lines the two-phase mixture of the coolant A is introduced into a coolant chamber 12 in the interior of the rotor body 3, to which area the liquid helium which cools the exciter winding flows. To limit introduction of heat into the coolant A as it passes through the transfer part 4 from the outer tube 13 thereof which is at ambient temperature, the coolant supply lines 11a, 11b, 11c are enclosed by a hollow-cylindrical radiation shield 15. This radiation shield 15 is cooled by coolant exhaust vapor B, which is taken centrally from the rotor body 3, for example, from the coolant chamber 12, and is supplied to the connection head of the machine via spiral cooling channels 16 in or at the radiation shield 15 and, thus, is discharged to the outside.

In addition, for thermal reasons, the entire internal space enclosed by the outer tube 13 of the transfer part 4 is evacuated. Accordingly there are formed in the transfer part, a vacuum chamber 18 lying inside the radiation shield 15 and a vacuum chamber 19 lying between the radiation shield and the outer tube 13. These vacuum chambers 18 and 19 are to be connected directly to the vacuum chambers present in the rotor body 3, surrounding, in particular, the superconducting exciter winding.

Within the central vacuum chamber 18, through which extend the coolant supply lines 11a to 11c at a small distance e from the radiation shield 15, the cryosorption pump 7 is disposed along the axis of rotation 2 practically over the total axial length of the transfer part 4. For reasons of easier assembly, this pump may be divided into several individual elements, of which are illustrated as segments only the element 7a facing the rotor body 3 and the element 7b facing the connection head. These elements, called cartridges, have a tubular outer part of thermally well conducting metal such as copper. Each of these metal tubes 20 is coated on its inside with a layer of a sorbent 21, as, for instance, of activated carbon. For the fixation of an activated carbon layer about 1 to 2 mm thick directly on the metal of the tubes 20, there may be used, for example, two-component adhesives or, more particularly, a Sn-Ag solder. Zeolite may also be applied in powder form and mixed with a binder to form a slurry on the roughened metal surfaces and allowed to dry thereafter Alternatively, the zeolite may be glued on with a heat-resistant mixture of waterglass and talcum. Coating of the interior is desirable so that the sorbent 21 will not become detached by centrifugal force. In addition, the coated metal tubes 20 are to have openings or holes 22 at their perimeters, in order to facilitate ingress of gas. To prevent direct heat radiation onto the sorbent 21 through these holes 22, the sorbent does not extend to the very edges of the holes.

At their end faces, the elements 7a and 7b of pump 7 may further have end walls 23 and 24, of which appropriately the end wall 24 toward the connection head is provided with a threaded part 25. Thus, using an assembly rod with appropriate thread, the individual pump elements can be introduced into and extracted out of the transfer part 4 from the connection head side. To this end, the end wall 26 of the end piece 9 facing the pump is provided with a corresponding assembly opening 27, through which the individual elements of the pump can be passed. This assembly opening is to be closed by a matching part 28, and for reasons of helium seal, this closure part is welded on its side toward the helium chamber 8. A corresponding annular weld seam is designated by 29 in the figure.

For the cooling of the individual elements 7a, 7b or respectively their sorbent layers 21, these elements are s connected with the coolant supply lines 11 carrying liquid helium LHe with good heat conduction but are detachable mechanically. For this purpose, special mounts 30 are attached at the coolant supply lines 11. They are, for example clamped on by shackle or club-like projections 31. These mounts each have a holding plate 32 extending substantially radially, which terminates on its side facing the respective pump element in a tubular base portion 33. This base portion, having an inside diameter slightly greater than the associated pump element is provided on its inside facing this element with annular groves 34, into which spring strips 35 known in themselves are to be inserted. Alternatively, the grooves for receiving the spring strips 35 may be machined into the outer sides of the metal tubes 20. It is through these spring strips that the thermal contact takes place between the metal tube 20 of the respective pump element and the associated mount 30, which represents a thermally well-conducting connection to the cold coolant supply lines 11. Due to the use of spring strips, a displacement of the individual elements of the sorption pump 7 along the axis of rotation 2 is thus made possible despite the desired good thermal contact between the parts 20 and 30.

As is further indicated in FIGS. 1A and 1B, to improve the mechanical stability of the arrangement, special support devices 38 are further provided within the transfer part 4, for example, between two mounts 30. These devices, consisting of poor heat-conducting material, are attached, like the mounts 30, to the coolant supply lines 11a, 11b, 11c and comprise in each instance a radially extending support plate 39 having a sufficiently large central opening 40 so that the respective pump element can readily be pushed through it. The devices 38 are braced against the inside of the radiation shield 15 through several elastic intermediate pieces 41 uniformly distributed on their outer edge in circumferential direction, as, for example, through spring bolts.

FIG. 2 shows schematically a view onto a transverse section through the transfer part 4 according to FIGS. 1A and 1B, this transverse section being placed along a sectional plane marked II—II in FIG. 1A. From FIG. 2 the uniform distribution in circumferential direction of the individual coolant supply lines 11a to 11c, in particular, is clearly evident as well as the configuration of the radial holding plate 32 of mount 30.

In the illustrated embodiment of a cryosorption pump according to the invention, it was assumed that the cold coolant supply lines 11a, 11b, 11c lie outside the pump 7. If desired, however, one or more such supply lines may be arranged inside the pump. Instead of individual lines, optionally, at least one channel with annular cross section may be provided.

Figure 3:
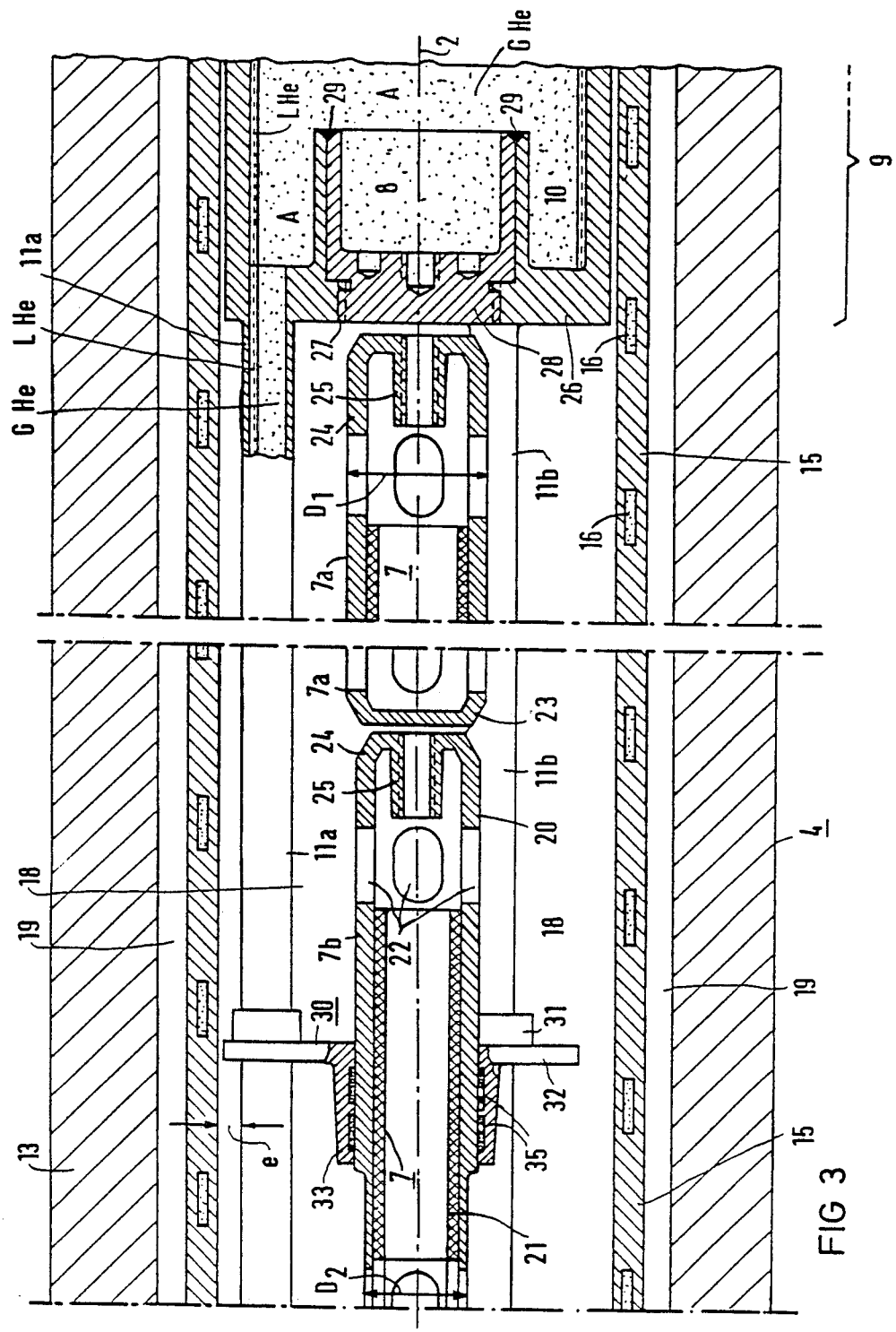
FIG. 3 shows an other advantageous future of the cryosorption pump shown in FIG. 1B.

In addition, at variance with the embodiment shown, the cryosorption pump may be composed of individual elements having different diameters $D_1$, $D_2$ (see FIG. 3). In fact, by using elements with diameters becoming larger stepwise as seen from the rotor body 3 onto the connection head, in which case the dimensions of the mounts 30 and support devices 38 must be adapted accordingly, assembly of the individual elements from the side of the connection head is facilitated.

What is claimed is:

1. In an electric machine having a superconducting exciter winding, the machine having a rotor comprising
   the superconducting exciter winding to be cooled by a cryogenic coolant;
   evacuable spaces for insulating the winding;
   at least a vacuum insulated coolant supply line for supplying coolant to the rotor; and
   a co-rotating transfer part for the coolant supply line on one side of the rotor having a central chamber in communication with the evacuable spaces,
   a cryosorption pump for perpetuating a thermal insulating vacuum in the rotor comprising:
   means for cryosorption disposed in the central chamber of the co-rotating transfer part along the axis of rotation thereof, said means for cryosorption thermally connected to the coolant supply line.

2. A cryosorption pump according to claim 1 wherein said means for cryosorption comprises several individual elements.

3. A cryosorption pump according to claim 2 wherein said individual elements comprise tube segments of thermally well conducting material coated on their inner side with a cryosorption agent.

4. A cryosorption pump according to claim 3 wherein the tube segments coated with the cryosorption agent are made of metal and have openings at their respective perimeters.

5. A cryosorption pump according to claim 2 and further including at least two mounts for each of said individual elements, said mounts supporting and guiding said elements for axial displacement, said mounts connected to said coolant supply line and establishing good thermal contact between said supply line and said individual elements.

6. A cryosorption pump according to claim 5 wherein the mount is sized such that there is a clearance between each individual element and the mount and further including at least one spring strip, inserted between the mount and the individual element, for bridging said clearance.

7. A cryosorption pump according to claim 5 wherein at least three tubular coolant supply lines supply coolant to the rotor and wherein said three tubular coolant supply lines are mechanically and thermally connected with the individual elements through the mounts.

8. A cryosorption pump according to claim 5 wherein said rotor includes a coolant exhaust vapor line and further includes a cylindrical radiation shield surrounding the coolant supply line and the cyrosorption means and wherein the shield is thermally connected with the coolant exhaust vapor line.

9. A cryosorption pump according to claim 2 wherein the individual elements have different outside diameters.

10. A cryosorption pump according to claim 2 wherein the machine has a connection head and the individual elements have, on their end faces facing the connection head of the machine, a threaded part for the screwing in of an assembly rod.

11. A cryosorption pump according to claim 10 wherein the co-rotating transfer part of the rotor includes an end-piece facing toward a connection head of the machine and wherein said end piece has a radial end wall having a closable opening for installing the individual elements inside the transfer part.

12. A cryosorption pump according to claim 1 wherein said rotor includes a coolant exhaust vapor line and further includes a cylindrical radiation shield surrounding the coolant supply line and the cyrosorption means and wherein, the shield is thermally connected with the coolant exhaust vapor line.

13. A cryosorption pump according to claim 12 and further including a thermally poorly conducting support device elastically mounting the coolant supply line or the cryosorption means within the radiation shield.

14. A cryosorption pump according to claim 13 wherein the thermally poorly conducting support device comprises a plurality of radially extending spring bolts.

15. A cryosorption pump according to claim 14 wherein the spring bolts are fabricated of a material with great heat resistance.

16. A cryosorption pump according to claim 12 and further including a thermally poorly conducting support device elastically mounting the coolant supply line and the cryosorption means within the radiation shield.

17. A cryosorption pump according to claim 16 wherein at least one of said mounts and one of said thermally poorly conducting support devices are arranged axially in alternating sequence.

* * * * *